United States Patent [19]
Mita

[11] 3,906,533
[45] Sept. 16, 1975

[54] SINGLE LENS REFLEX CAMERA HAVING AN INTERLOCK ARRANGEMENT FOR PREVENTING LIGHT MEASUREMENT ERRORS

[75] Inventor: Kunio Mita, Kami-Fukuoka, Japan

[73] Assignee: Asahi Kogaku Kogyo Kabushiki Kaisha, Tokyo, Japan

[22] Filed: Aug. 1, 1974

[21] Appl. No.: 493,714

[30] Foreign Application Priority Data
Aug. 8, 1973  Japan.............................. 48-92806

[52] U.S. Cl................................. 354/272; 354/50
[51] Int. Cl.²......................................... G03B 9/07
[58] Field of Search ............ 354/272, 266, 268, 23, 354/48, 50, 51, 60 R

[56] References Cited
UNITED STATES PATENTS

| | | | |
|---|---|---|---|
| 3,756,131 | 9/1973 | Kuramoto et al. | 354/51 |
| 3,791,277 | 2/1974 | Kobori et al. | 354/51 |
| 3,829,872 | 8/1974 | Ueda et al. | 354/272 X |
| 3,831,180 | 8/1974 | Tsujimoto | 354/51 |

*Primary Examiner*—Joseph F. Peters, Jr.
*Attorney, Agent, or Firm*—Christie, Parker & Hale

[57] ABSTRACT

A single lens reflex camera is interlocked to prevent operation of a through-the-lens full-aperture light measuring system whenever the lens diaphragm is manually stopped down to provide depth of field previewing.

2 Claims, 6 Drawing Figures

PATENTED SEP 16 1975 3,906,533
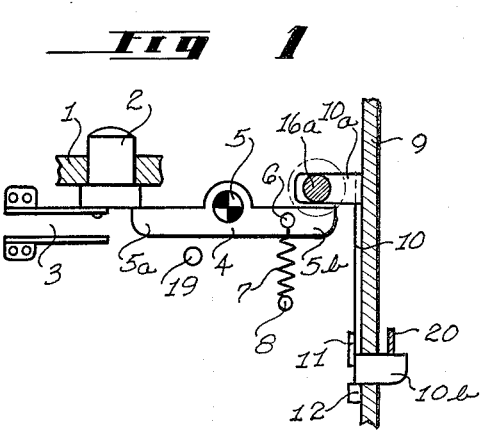
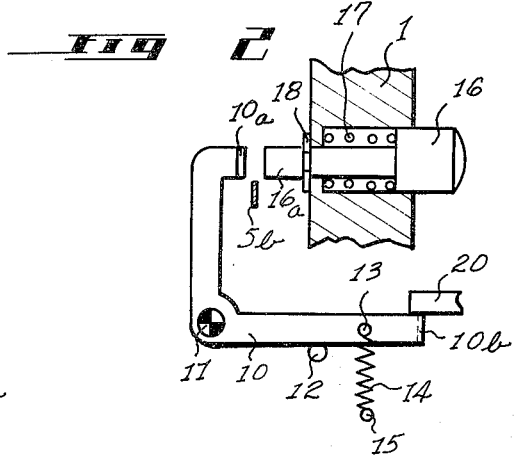
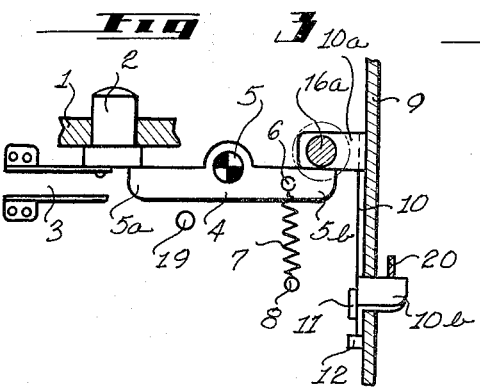
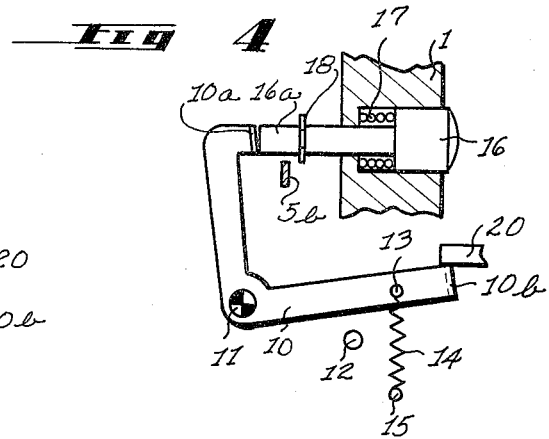
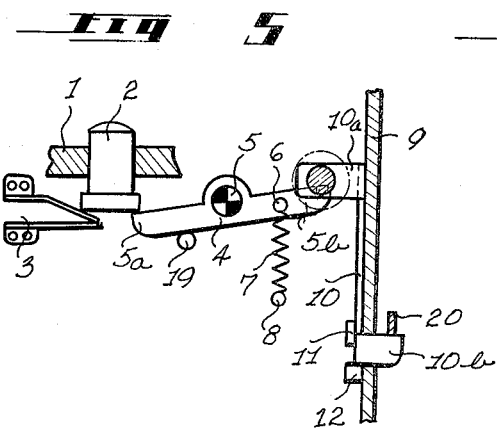
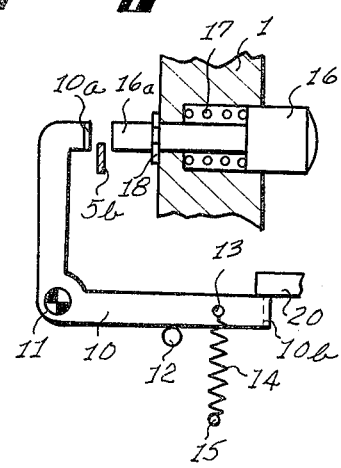

SINGLE LENS REFLEX CAMERA HAVING AN INTERLOCK ARRANGEMENT FOR PREVENTING LIGHT MEASUREMENT ERRORS

BACKGROUND OF THE INVENTION

In general, this invention relates to single lens reflex cameras of the type having a through-the-lens (TTL) full-aperture light measuring system. In particular, it relates to an interlock arrangement for preventing errors that would occur in a circumstance in which the light measuring system is operated at the same time the lens diaphragm is stopped down in connection with depth of field previewing.

It is conventional for a lens used in a single lens reflex camera to have a diaphragm that automatically stops down from full-aperture to a manually pre-selected aperture when a picture-taking operation is actuated. One of the advantages of this is that, while the photographer is composing a picture, all available light is directed to the ground glass focusing screen thereby to yield the brightest possible viewfinder image.

On the other hand, such full-aperture viewing does not provide desirable information about depth of field. For example, where the lens diaphragm is manually set for a relatively small aperture such as f16 (and particularly where relatively short-distance focusing is involved), the final picture will have considerably more depth of field than the photographer might think from examining the viewfinder while the lens diaphragm is at a full-aperture condition such as f1.4. For this reason, many SLR's provide for depth of field previewing. That is, the camera is provided with a separate push button that, when actuated, causes the diaphragm to stop down to the pre-selected aperture.

Such depth of field previewing can have the undesirable side effect of causing errors in the camera TTl system. Generally, the TTl system is designed to operate accurately with the diaphragm fully open. Thus, should the photographer preview the depth of field at the same time he is pre-selecting a diaphragm setting on the basis of the TTL indication (usually also provided in the viewfinder), a significant exposure error can result. Similarly, in automatic exposure control cameras wherein the shutter release button actuates the TTL system, improper exposure can result where the photographer is simultaneously previewing depth of field.

SUMMARY OF THE INVENTION

This invention is directed to eliminating the problems described above as to the exposure errors that result from operation of a TTL system of the full-aperture type simultaneously with the operation of a depth of field previewing arrangement.

The combination of this invention is embodied in a single lens reflex camera of the type having an electrically operated TTL, full-aperture system. An electrical switch in the camera is provided for operating the TTL system. The lens has an adjustable diaphragm, and, as described above, the TTL system is subject to error whenever operated with the lens aperture set to less than full-aperture.

So as to provide desirable information about depth of field, the combination of this invention includes first means for adjusting the lens diaphragm. The first means is manually actuable when the electric switch is not operating the TTL system. Second means, manually actuable when the first means is not manually actuated, provides for causing the electric switch to operate the TTL system. Significantly, third means provide for interlocking the first and second means so that only one of the two can be manually actuated at a time. This interlock prevents the above-described exposure errors from occurring.

Preferably, the first means includes a push button and a linkage for enabling operatin of the push button to adjust the diaphragm. The linkage includes a driving member and a follower member that, when the push button is not operated, are spaced apart to define a passageway. When the push button is operated, the driving member moves into engagement with the follower member thereby closing the passageway. The interlocking means preferably includes an actuation-limiting member having an arm positioned so as selectively to be free to move through said passageway or to be stopped from so moving.

BRIEF DESCRIPTION OF THE DRAWINGS

FIG. 1 is a front elevation view of the preferred construction and arrangement of the combination of this invention as embodied in a single lens reflex camera of which a part is shown in section, this view illustrating a non-actuated condition;

FIG. 2 is a side elevation view corresponding to FIG. 1;

FIG. 3 is a front elevation view similar to FIG. 1 but differing therefrom in that depth of field previewing is taking place;

FIG. 4 is a side elevation view corresponding to FIG. 3;

FIG. 5 is a front elevation view similar to FIG. 1 but differing therefrom in that light measuring is taking place; and FIG. 6 is a side elevation view corresponding to FIG. 5.

DETAILED DESCRIPTION

In the drawings various portions of the body 1 of a single lens reflex camera are shown in section. A push button 2 is mounted with a portion thereof projecting outside the camera body so that the photographer has easy access to it. When the photographer depresses the push button 2 (and its operation is not interlocked as described below) the lower surface thereof acts against an upper contact of an electrical switch 3. Electric wires (not shown) are connected at one end to the switch 3 and are connected at the other end to a conventional TTL system (not shown) of the full-aperture type. Accordingly, when the switch 3 closes incident to operation of the push button, the TTL system is actuated. Preferably, the push button 2 is made of an electrically non-conductive material so that the camera body is electrically isolated from the switch 3.

An actuation limiting lever 4 is pivoted on an axis 5 which extends to the camera body 1. At one end, the lever 4 has an arm 5a which engages the bottom surface of the push button 2. At its opposite end, the lever 4 has an arm 5b. As best shown in FIG. 2, the arm 5b is free to move upwardly into a passageway defined between two members of a linkage. This linkage comprises a driving member 16a and a follower member 10. The driving member 16a forms the forward end of a push button 16, and the follower member 10 preferably takes the form of a bell crank.

A pin 6 projects from the actuation limiting lever 4. Between this pin 6 and another pin 8 that is fixed to the camera body there is hooked a spring 7 which biases the actuation limiting lever 4 clockwise as viewed in FIGS. 1, 3 and 5 so as thereby indirectly to push up the push button 2. The follower member or bell crank 10 is pivoted on an axis 11 extending to a mirror box 9. Between a pin 13 fixed on the follower member 10 and another pin 15 fixed to the mirror box 9 there is hooked a spring 14, which urges the follower member 10 clockwise. The follower member 10, however, is limited in its rotatable range.

The follower member or bell crank 10 has formed at the end of one arm a bent portion 10a to provide a surface against which the driving member 16a pushes when the push button 16 is operated. At the end of the opposite arm of the bell crank, an arm 10b is engaged with a diaphragm lever 20 of the photographing lens. Although not shown in the drawing, a spring force is always applied to the diaphragm lever 20 so as to engage it with the follower member 10.

The push button 16 occupies a stepped hole formed in the camera body 1 and is urged by a spring 17 so that one end of the button 16 projects outwardly from the camera body 1 for an external operation. The outwardly projecting range of travel of the manual diaphragm button 16 is limited by a retaining washer 18. Indicated at 19 is a stopper for limiting the counter-clockwise rotation of the actuation limiting lever 4.

With the foregoing arrangement, when the push button 16 is depressed as shown in FIG. 4, the diaphragm lever 20 is actuated to stop down the lens diaphragm to a predetermined value as a result of the operation of the linkage which includes the follower member 10. At this time, the forward end 16a of the push button 16 is advanced into the counter-clockwise rotation range of travel of the arm 5b of the actuation limiting lever 4 (i.e., the passageway is closed) so that the actuation limiting lever 4 cannot be rotated any more even if the push button 2 is depressed. That is, inasmuch as the actuation limiting lever 4 is restrained from rotating counter-clockwise, its arm 5a acts as a stop so that the push button 2 is disabled from forcing the switch to close. As a result, the TTL system is interlocked from operating whenever the push button 16 actuates the depth of field previewing.

On the other hand, when the push button 2 is depressed as shown in FIG. 5, the switch 3 is closed and, simultaneously, the actuation limiting lever 4 is rotated counter-clockwise. Accordingly, the arm 5b of actuation limiting lever 4 enters the passageway. Under these conditions, when the push button 16 is depressed, it stops upon contact with the arm 5b as shown in FIG. 6. Thus, no force is transmitted to the bell crank, and the lens diaphragm cannot be actuated.

It will be appreciated from the foregoing that with the mechanism of this invention any danger that the light measuring switch is operated simultaneously with the manual diaphragm can be eliminated. This precludes any possibility of erroneous light measurement and also eliminates any possibility of error exposure in an automatic exposure control camera wherein the light measuring switch operates in an early stage of shutter release operation and subsequently the shutter is released. In addition, the manually interfering mechanism of this invention, being constructed from such a small number of elements and being so simple in arrangement, can be manufactured at a low cost and easily built into the camera body.

What is claimed is:

1. In a single lens reflex camera having an electrically operated light measuring system and an electrical switch for operating the light measuring system, the lens having an adjustable diaphragm for controlling the aperture of the lens, the light measuring system being of the through-the-lens, full-aperture type that is subject to error when operated with the lens diaphragm set to less than full-aperture, the combination comprising:

first means, manually actuable when said switch is not operating the light measuring system, for adjusting the diaphragm so as to provide for previewing depth of field;

second means, manually actuable when said first means is not manually actuated, for causing said switch to operate the light measuring system; and third means for interlocking said first and second means so that only one of the two at a time can be manually actuated.

2. The combination of claim 1 wherein the first means includes a push button and a linkage for enabling operation of the push button to adjust the diaphragm, the linkage including a driving member and a follower member that, when the push button is not operated, are spaced apart to define a passageway, the driving member being movable into engagement with the follower member and thereby closing said passageway when the push button is operated; and wherein the third means includes an actuation-limiting member having an arm positioned so as selectively to be free to move through said passageway when the second means is actuated and to be stopped from moving when the push button is operated.

* * * * *